Aug. 1, 1967     T. H. N. SPENCER     3,333,575
ANIMAL WATERING DEVICE

Filed Jan. 13, 1965     2 Sheets-Sheet 1

Inventor:
Thomas H. N. Spencer
By Kenyon, Palmer
Stewart & Estabrook
Attorneys

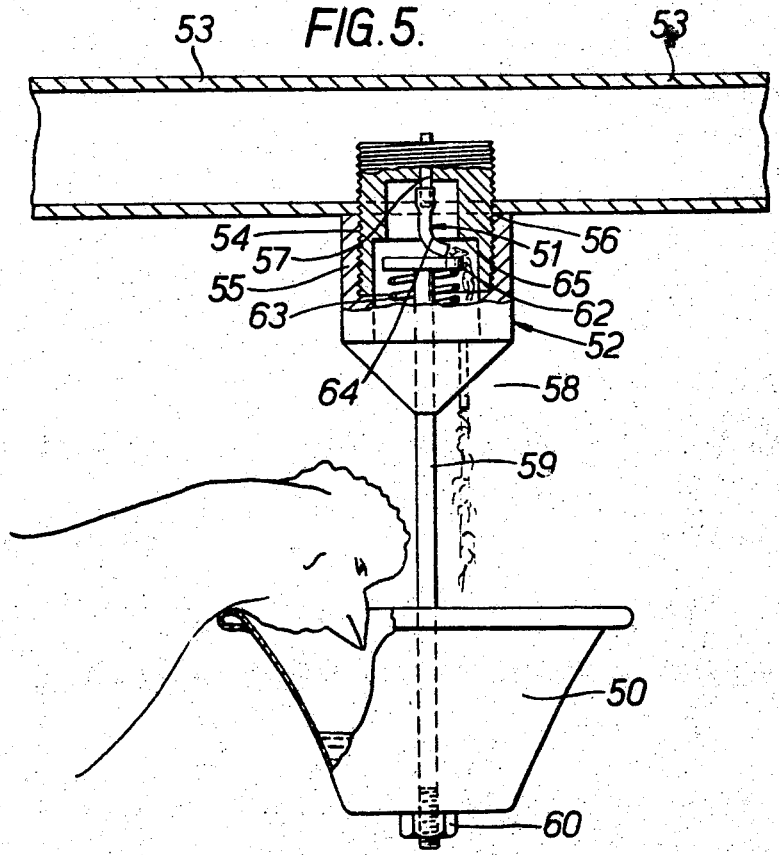
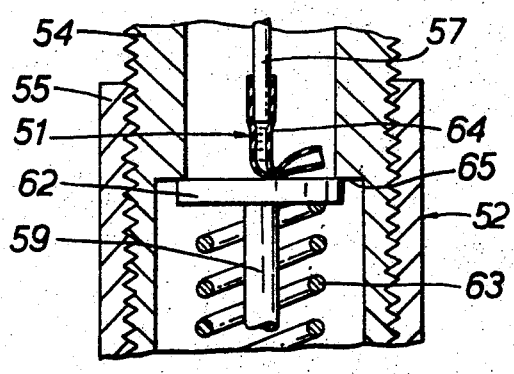

3,333,575
ANIMAL WATERING DEVICE
Thomas Henry Newnham Spencer, Ramley House,
Pennington, Lymington, Hampshire, England
Filed Jan. 13, 1965, Ser. No. 425,135
Claims priority, application Great Britain, Jan. 16, 1964,
1,932/64
9 Claims. (Cl. 119—75)

ABSTRACT OF THE DISCLOSURE

A watering device for birds or animals with a movable pan to contain the water to be drunk has, as a valve to control the supply of water to the pan, a length of resilient flexible tube which is bent about a diameter to buckle and flatten the tube and close its bore so cutting off the water supply. In one form the tube is buckled and the water supply cut-off, by downward movement of the pan under the weight of water it contains. In another form water flows only when the bird or animal presses on the pan and the tube is buckled and the water supply cut off when this pressure is relaxed and the pan is returned by a spring.

---

This invention relates to watering devices for animals and birds of the kind in which an open watering pan, trough or other receptacle, hereinafter collectively referred to by the term pan, is arranged to receive water from a supply and is so mounted that the pan moves, against the action of a restoring force, between higher and lower positions and this movement is used to actuate means for cutting off the supply of water.

In a known animal watering device, a pan is supplied with water through a length of resilient tube which is flattened by being squeezed between a movable member and an abutment. Closure of the bore of the tube occurs at the place at which the tube is squeezed.

The present invention consists in a watering device for birds or animals, adapted to be connected to a water supply pipe under low pressure, and comprising a support, a pan movable on the support between a higher extreme position to which it is normally biased, and a lower extreme position, an inlet member adapted to be connected to the supply pipe, a resilient flexible tube connected at one end to the inlet member and opening at the other into the pan, a fixed member on the support and a pressure member movable with the pan, the tube in one of the extreme positions being smoothly curved with its bore open and the pressure member during the movement of the pan towards the other extreme position acting, in co-operation with the fixed member, on the tube to induce internal stress in the tube and thereby bend it about a diameter of the tube remote from the places of contact of the tube with the pressure member and the fixed member, and in said other extreme position the internal stress in the tube being sufficient to buckle and flatten the tube and close its bore, the bore of the tube re-opening by the resilience of the tube when the pan returns to said one extreme position.

In still another watering device of the prior art the internal stress in the flattened tube acts entirely to open the tube in opposition to the externally applied squeezing force. By contrast in accordance with the present invention, while there is still stress tending to open the tube it is overcome locally by the stress induced internally in the tube wall by the external distorting force and the tube is caused to buckle and its bore to close at the position at which the induced internal stress is greatest.

The length of tube may be the full length of a piece of tube or a portion of a longer piece. The resilient material of the tube may be rubber, synthetic resin or any other sufficiently resilient material suitable for the fluid to be controlled and the conditions of use. Surgical rubber tube has been used successfully for water.

The pressure member may act on the tube to distort it and induce the buckling stress in any of a variety of ways which produce bending of the length of tube from its unstressed condition. For example, a fixed member may co-operate with the pressure member. The fixed member may be an abutment, and the pressure member and the abutment bear externally on the tube. Alternatively, the pressure member and the fixed member may be formed by rigid tubular connections to the flexible tube. In each case the pressure member and the fixed member act to close the tube about a diameter at a position in the loop or length of tube away from the points of contact.

The bending of the length of tube necessary to cause its collapse may be produced by any of a variety of movements between its ends for example: angular movement between the axes of the ends of the length; movement of the ends of the length towards or away from one another in axial or lateral directions; and relative rotation between the ends of the tube or a combination of such movements. These movements may be applied to the tube by relatively stiff connections to the ends of the tube forming also the liquid connections to the tube bore. If the tube is in an unstable condition when distorted so that without removal of the distorting force it could take up a formation in which the bore remains open, guide means may be provided to constrain the tube to remain in the required formation. Such a situation could arise, for example, if instead of bending locally across a diameter of the tube, the tube by more distributed bending and twisting stress could form a smooth loop with an open bore.

In one form of valve according to the invention a length of naturally straight tube has its end portions fixed and substantially in line but between its ends it is coiled into a complete loop lying in one plane, except for the displacement necessary to allow the ends of the loop to cross. The loop is normally smoothly curved and though, if the bore of the tube is initially circular, it will have been made somewhat elliptical by the formation of the loop, it will remain open. By distorting the loop by applying a force, for example at the mid-point of the loop, local bending stresses will be induced which will cause the tube to buckle and flatten across a diameter so closing the bore. If the force is applied by a member having a relatively narrow edge making transverse line contact with the tube, buckling will most probably occur at the line of contact. If, however, the force is distributed along the middle of the loop for example by a movable pressure plate buckling will be more likely to occur at one end or both ends of the middle of the loop.

In another form of valve according to the invention in which the mode of operation is similar, a length of initially straight tube is bent into a U joining spaced apart, parallel rigid tubular connections. A force applied to one limb close to the bend of the U and urging that limb towards the other limb will cause buckling and bore closure at the middle of the bend of the U.

In a further form of the invention the length of tube is normally straight but a medial portion is bent, when the valve is to be closed, by bringing together members on opposite side of the tube, one for example having a transverse groove and the other a ridge which presses the tube into the groove. The tube is not flattened by squeezing between the members but the bending induces internal stresses which cause the tube to buckle at the cross-section of greatest bending stress, for example at the ridge and/or edges of the groove.

In another form of the invention a length of naturally straight tube is mounted between aligned relatively stiff tubular connections. The tubular connections forming the mounting are moved axially towards one another. The tube is bent and finally buckles, closing the bore usually at the middle of the length.

In still another form of the invention, a length of initially straight flexible tube joins rigid tubular connections one or each of which is pivotally mounted so that the axes of the tubular connections can be moved angularly one with respect to the other. When the valve is open the axes of the tubular connections converge only slightly and the flexible tube takes up a V shape, though with a rounded apex so that its bore remains open. By moving the tubular connections angularly so that they converge more sharply, thereby narrowing the V, the flexible tube is caused to buckle at the apex so that the flow of liquid is stopped. One or each tubular connection may be extended by a pressure plate or member to engage the portion of the flexible tube near the connection and confine the acute bending to the apex of the V. The plate or member may have a groove or other formation to act as a guide to prevent lateral displacement of the flexible tube.

Embodiments of the invention will now be described by way of example with reference to the accompanying drawings in which:

FIGURE 5 is a front view partly in section of another form of watering device including an alternative form of valve according to the present invention shown in its open condition; and FIGURE 6 is a fragmentary view in section showing the valve of FIGURE 5 in its closed condition.

The watering device shown in FIGURES 1 to 4 of the accompanying drawings is intended primarily for birds and comprises a pan 10 pivoted to a pan support 11, a water supply pipe 12 rigid with the pan support 11 and a valve 13 between the supply pipe 12 and pan 10 for controlling the water supply to the pan 10.

Figure 1:
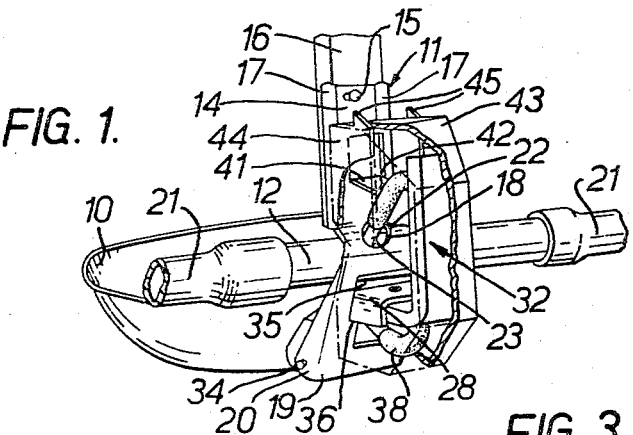
FIGURE 1 is a rear perspective view of a watering device according to the present invention.

The pan support 11 is formed from sheet metal and has a vertical upper portion 14 which is secured by a screw 15 to a mounting bracket 16 by means of which the watering device can be secured to a suitable rigid support or surface in the pen, cage or other place in which the birds are kept. Side edges 17 of the upper portion 14 of the pan support, FIGURE 1, are curved forwards and lie against the side edges of the mounting bracket 16 so as to locate the support with respect to the mounting bracket. Below the vertical upper portion 14, the pan support 11 is curved at first rearwardly and then downwardly so as to form an elbow 18, and below the elbow 18 it has a downwardly and slightly forwardly inclined lower portion 19 with forwardly-directed, parallel side flanges 20. Rigidly secured, for example by welding or brazing, in the hollow of the elbow 18, at the front of the pan support, is the water supply pipe 12 which extends horizontally and transversely of the pan support.

The supply pipe 12 is open at both ends and is fitted at its ends with hoses 21 for connection to a header tank or other low-pressure water supply and to the supply pipes of other similar watering devices. From the middle of the supply pipe 12 extends rearwards and inclined upwards, through an aperture 22 is the elbow 18 of the pan support, a short, rigid, small-bore branch tube 23 the lower end of the bore of which is open to the upper part of the bore of the supply pipe 12 and the upper end of which is connected to the valve 13.

The pan 10 is made from sheet metal and is in the form of an open trough. To the back of the pan 10 a bracket 24 is rigidly secured by nuts 25 and bolts 26. The bracket 24 could alternatively be secured to the pan 10, for example, by welding or brazing, or by any other suitable means. The bracket 24 has a downwardly and slightly forwardly inclined leg 27 to which the pan is secured and a horizontal, rearwardly-directed arm 28 of inverted channel shape which straddles and is secured by a nut 29 and bolt 30 to the forward end of a horizontal limb 31 of an L-shaped balance arm 32. The other, upright, limb of the balance arm 32 is disposed behind and spaced from the pan support and forms a pressure member 33 whose function will be revealed later. The leg 27 of the bracket is pivoted to the pan support 11 between the parallel side flanges 20 of the lower portion 19 by means of a pivot pin 34 passed horizontally through and anchored at its ends to the side flanges 20 of the lower portion 19. The horizontal arm 28 of the bracket extends rearwards through an opening 35 in the lower portion 19 of the pan support. From the foregoing description it will be understood that the pan can move angularly about the horizontal pivot pin 34. The balance arm 32 acts as a counterweight to the pan and is a little heavier than the pan so as to cause the pan when it contains only a small amount of water to occupy the position shown in FIGURE 2, in which it is raised and tilted slightly backwards. In this raised position of the pan the forward end of the horizontal limb 31 of the balance arm 32 rests on shoulders 36 in the side edges of the opening 35 which serve as stops to prevent further angular movement of the pan beyond the desired raised position. The opening 35 is of sufficient depth to allow for movement of the arm 28 of the bracket and the horizontal limb 31 of the balance arm 32 as the pan pivots between the raised position and a low position which it occupies when it contains a high level of water.

A small-bore delivery tube 37 passes through, and is rigidly secured by welding or brazing to, the rear wall of the pan, and through the leg 27 of the bracket. The delivery tube 37 is slightly downwardly inclined rearwardly and extends below the horizontal arm 28 of the bracket and through the bottom part of the opening 35 in the lower portion 19 of the pan support.

The rear ends of the branch tube 23, from the supply pipe 12, and the delivery tube 37 to the pan are joined by a length of flexible rubber tube 38 which forms the valve 13. The flexible tube 38, which is naturally straight, extends upwards and rearwards from the delivery tube 37, is then bent over, so as to form a substantially inverted U portion 39, and extends downwards, bearing against the front of the pressure member 33 of the balance arm 32, through an aperture 40 in the horizontal limb 31 of the balance arm, and below the horizontal limb 31 is curved smoothly forwards to the rear end of the delivery tube 37. The branch and delivery tubes and the pressure member 33 constrain the flexible tube 38 to the shape described.

Pierced and bent horizontally rearwards out of the upper portion 14 of the pan support is a pressure plate 41 which at its rear edge engages the flexible tube 38 between the delivery tube 37 and the apex of the U portion 39 of the flexible tube. A notch 42 is provided in the rear edge to locate the flexible tube against sideways movement.

The flexible tube 38 and balance arm 32 are enclosed by a detachable sheet metal cover 43 supported on the back of the pan support by two rearwardly directed, upright and parallel wings 44 on the back of the upper portion 14 which extend into the cover 43 and have ears 45 on their upper edges which engage slots 46 in the top of the cover. The cover 43 is open at the front but its forward edges are shaped to follow closely the contours of the pan support from the upper portion 14 to the lower portion 19 so that the pan support effectively closes the front of the cover. The cover protects the tube from the birds and from becoming soiled.

Figure 2:
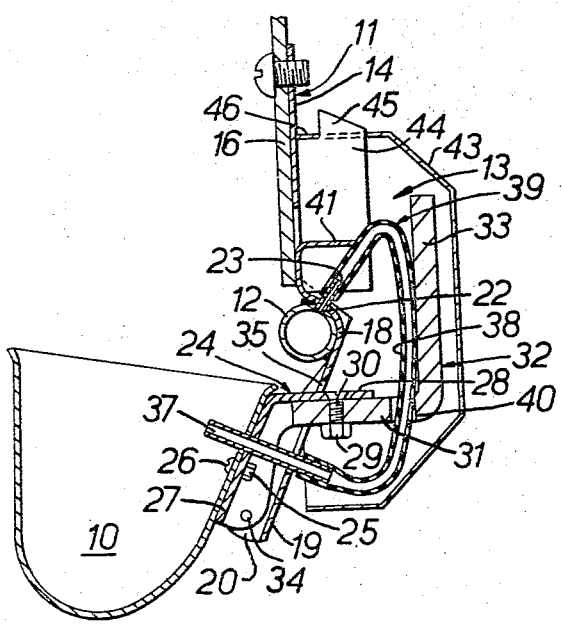
FIGURE 2 is a vertical section through the watering device with a valve controlling the water supply in its open condition.

In operation, if the pan contains only a small amount of water it is held in the raised position, as described and as shown in FIGURE 2, by the balance arm. In this position the pressure member 33 bears only lightly on the flexible tube and the U portion 39 of the tube is bent smoothly and its bore is open. If the water-supply is connected, water then flows from the supply pipe 12, through the branch tube 23, flexible tube, and the delivery tube 37 into the pan. When there is sufficient water in the pan to overcome the weight of the balance arm 32 the pan starts to tilt forwards and downwards about the pivot pin 34 urging the pressure member 33 against the flexible tube.

Figure 3:
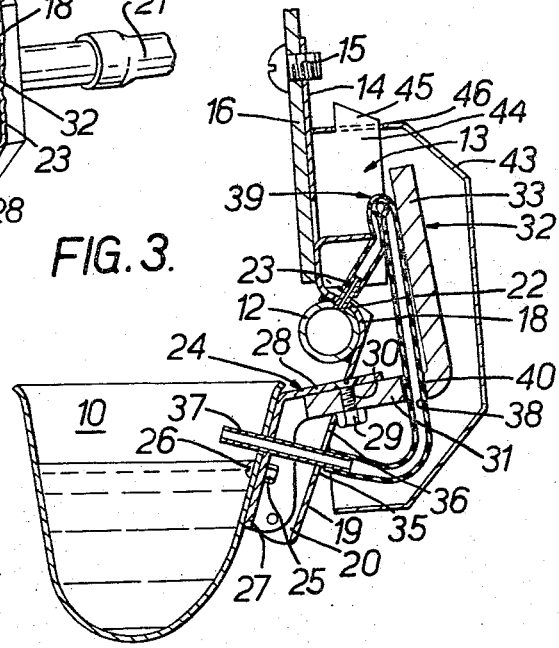
FIGURE 3 is a vertical section through the watering device and the valve which is in its closed condition.
Figure 4:
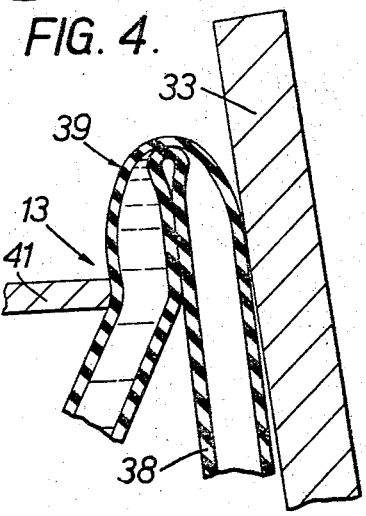
FIGURE 4 is an enlarged detail of part of the valve as seen in FIGURE 3.

The flexible tube resists this movement but as more water flows into the pan its resistance is overcome and the U portion 39 of the flexible tube is more and more sharply bent between the pressure member 33 and the pressure plate 41 until it buckles at the apex of the U portion 39, as shown in FIGURE 3 and more clearly in FIGURE 4, closing the bore and cutting off the flow of water to the pan. The pressure plate 41 restricts bodily upward movement of the U portion 39 by the pressure member 33 and ensures that it is bent more sharply. It will be noted that the water supply is cut off by the bore of the flexible tube being closed by buckling of the tube at the apex of the portion 39, not by flattening of the tube between the pressure member 33 and pressure plate 41 directly opposite the pressure plate.

When water is removed from the pan, the pan rises, under the restoring action of the balance arm, and the pressure member 33 moves away from the pressure plate 41 to allow the bore of the tube at the apex of the U portion to open and water to flow again. Re-opening the bore is dependent mainly on the resilience of the rubber of which the tube is made. If desired positive re-opening may be arranged by attaching that portion of the tube which normally bears on the pressure member, by suitable means to the pressure member.

In the embodiment shown in FIGURES 5 and 6 a watering device for birds is provided which comprises a pan 50, a valve 51, a valve housing 52 and a water supply pipe 53.

The valve housing 52 is formed by upper and lower, hollow cylindrical parts 54 and 55 respectively each closed at one end and connected together at their open ends, the upper part 54 being externally screw-threaded and screwed into the lower part 55 which is complementarily-internally screw-threaded. The closed end of the upper part 54 is screwed into an aperture 56 in the wall of the supply pipe 53 which is disposed horizontally, transversely of the valve housing. As in the previous embodiment the supply pipe may be open-ended and be connected by hoses to a water supply tank and to the supply pipes of other similar devices. Alternatively the supply pipe 53 may be a long length of piping to which the valve housings of several similar watering devices are connected at spaced intervals. The closed end of the upper part 54 projects into the bore of the supply pipe and a small-bore inlet tube 57 open to the bore extends axially into the upper part 54 through its closed end. A small-bore delivery tube 58 extends vertically downwards through the closed end of the lower part 55 of the valve housing and is offset from the axis of the lower part. Water from the supply pipe enters the valve housing by way of the inlet tube 57, under the control of the valve 51, and issues from the housing by way of the delivery tube 58 into the pan 50.

The pan 50 is made of sheet metal and is in the form of a flared cup which is suspended directly below the valve housing and delivery tube 58 by a vertical rod 59 which extends axially of the pan 50 and is secured at its bottom end to the bore of the pan by a nut 60. The upper end of the rod 59 enters axially into the lower part 55 of the valve housing through the closed end of the lower part. A pressure disc 62 is secured by welding or brazing at the top of the rod 59, inside the valve housing. Inside the valve housing a helical compression spring 63 is fitted around the rod 59 and bears at one end against the underside of the pressure disc 62 and at the other end against the closed end of the lower part 55 of the valve housing so that the rod, and thereby the pan 50, is normally urged upwards to a raised position. A stop to further upward movement of the rod beyond a desired fully raised position is provided by a downwardly directed shoulder 65 in the upper part 54 of the valve housing which the pressure disc 62 engages when the rod reaches the desired fully raised position.

The valve 51 is formed by a short length of naturally straight flexible rubber tube 64 which at one end is fitted over the bottom end of the inlet tube 57 and at the other end is free but is acted upon by the pressure disc 62.

In operation, the pan is normally held in the raised position, as described, under the action of the compression spring 63. In this position the pressure disc 62 is urged against the free end portion of the flexible tube 64 causing the tube to bend and buckle at an intermediate part of its length, as shown in FIGURE 6, thus closing the bore of the tube and preventing the flow of water into the valve housing.

If a bird wishes to drink from the pan it has to arch its neck over the rim of the pan, as indicated in FIGURE 5, and if the water level is low it bears on the rim in trying to reach the water and presses the pan downwards against the action of the compression spring 63. As the pan is urged downwards the pressure disc 62 is drawn downwards from the flexible tube thus relieving the buckling stress which it had imposed in the tube. As the stress is relieved the tube by the resilience of the rubber of which it is made tends to return to its naturally straight condition thus opening the bore and allowing water, if the water supply to the supply pipe is turned on, to enter into the valve housing and pass out through the delivery tube to fill the pan. When the water level rises to a level which the bird can reach more easily it ceases to press on the pan which rises closing the valve and stopping the flow of water.

The length of the flexible tube is so arranged that even when the pan is full and therefore the pressure disc is in its lowest position, the free end of the flexible tube is still in contact with the pressure disc and the tube is bent to a certain extent although its bore is open. This ensures that when the pressure disc returns to its raised position the buckling stress which it induces in the flexible tube is always concentrated at a particular part of the tube length.

I claim:

1. A watering device comprising a pan pivoted to a support for movement between a higher position, to which it is normally biased, and a lower position; the support having rigid with it a supply pipe adapted to be connected to a low pressure water supply and having connected to its bore an inlet pipe for supplying water to the pan by way of a valve which comprises a length of resilient, flexible tube connected at one end to the inlet tube and at the other opening to the pan, and having a portion of its length bent to substantially U-shape (with its bore open when the pan is in its higher position) between a fixed member rigid with the support and a pressure member which is movable with the pan and is arranged, as the pan approaches the lower position, to move towards the fixed member to distort the U-shaped portion of the tube and induce local stress within the resilient material of the tube wall at the bend of the U-shaped portion and cause the tube to buckle and its bore to close.

2. A watering device according to claim 1 wherein the fixed member is an abutment and the pressure member and the abutment bear externally on the tube.

3. A watering device according to claim 1 wherein the pressure member and the fixed member are formed by rigid tubular connections to the flexible tube.

4. A watering device according to claim 1 wherein the pan is biased to its higher position by a counter weight a portion at least of which also constitutes the movable pressure member.

5. A watering device adapted to be connected, for the supply of water, with a supply pipe, comprising a pan movable between a higher position, to which it is normally biased, and a lower position, an inlet member adapted to be connected to the supply pipe and a valve having an outlet to the pan and including a resilient, flexible tube connected at one end to the inlet member and being acted upon by a member movable with the pan and adapted to bend the tube, when the pan is in the higher position, to induce local stress within the resilient material of the tube wall and cause the tube to buckle and its bore to close thereby preventing the supply of water to the pan, movement of the pan from the higher to the lower position under downward, externally applied force on the pan causing the member to move away from the tube sufficiently to relieve the stress in the tube wall and allow the bore to open and enable water to flow to the outlet and thence to the pan.

6. A watering device for birds or animals, adapted to be connected to a water supply pipe under low pressure, and comprising a support, a pan movable on the support between a higher extreme position to which it is normally biased, and a lower extreme position, an inlet member adapted to be connected to the supply pipe, a resilient flexible tube connected at one end to the inlet member and opening at the other into the pan, a fixed member on the support and a pressure member movable with the pan and with respect to the fixed member, the tube in one of the extreme positions being smoothly curved with its bore open and the pressure member during movement of the pan towards the other extreme position acting, in co-operation with the fixed member, on the tube to induce internal stress in the tube and thereby bend it about a diameter of the tube remote from the places of contact of the tube with the pressure member and the fixed member, and in said other extreme position the internal stress in the tube being sufficient to buckle and flatten the tube and close its bore, the bore of the tube re-opening by the resilience of the tube when the pan returns to said one extreme position.

7. A watering device according to claim 6 wherein the pan is pivotally mounted and is movable by the weight of a predetermined quantity of water contained in the pan from the higher position to the lower position, the bore of the resilient tube being open in the higher position and closed in the lower position.

8. A watering device according to claim 6 wherein the fixed member is an abutment and the pressure member and the abutment bear externally on the tube.

9. A watering device according to claim 6 wherein the pressure member and the fixed member are formed by rigid tubular connections to the flexible tube.

References Cited

UNITED STATES PATENTS

| | | | |
|---|---|---|---|
| 638,842 | 12/1899 | Glenn | 119—81 |
| 682,779 | 9/1901 | Bade. | |
| 1,010,562 | 12/1911 | Woodward | 137—451 |
| 2,241,636 | 5/1941 | Eliason | 137—451 |
| 2,274,678 | 3/1942 | Eliason | 119—78 |
| 2,831,497 | 4/1958 | Skerritt | 137—451 X |

FOREIGN PATENTS 436,035  10/1926  Germany.

WILLIAM F. O'DEA, *Primary Examiner.*

D. R. MATTHEWS, *Assistant Examiner.*